(12) United States Patent
Aimura et al.

(10) Patent No.: US 9,158,979 B2
(45) Date of Patent: Oct. 13, 2015

(54) VEHICLE VICINITY MONITORING DEVICE

(71) Applicant: HONDA MOTOR CO., LTD., Minato-Ku, Tokyo (JP)

(72) Inventors: Makoto Aimura, Utsunomiya (JP); Hiroyuki Koike, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 6 days.

(21) Appl. No.: 14/351,278

(22) PCT Filed: Oct. 5, 2012

(86) PCT No.: PCT/JP2012/075933
§ 371 (c)(1),
(2) Date: Apr. 11, 2014

(87) PCT Pub. No.: WO2013/058128
PCT Pub. Date: Apr. 25, 2013

(65) Prior Publication Data
US 2014/0270378 A1 Sep. 18, 2014

(30) Foreign Application Priority Data
Oct. 18, 2011 (JP) ................................ 2011-229015

(51) Int. Cl.
*G06K 9/00* (2006.01)
*G08G 1/16* (2006.01)

(52) U.S. Cl.
CPC ........ *G06K 9/00805* (2013.01); *G06K 9/00362* (2013.01); *G06K 9/00369* (2013.01); *G08G 1/166* (2013.01)

(58) Field of Classification Search
CPC ...................................... G06K 9/00
USPC .......................................................... 382/100
See application file for complete search history.

(56) References Cited

U.S. PATENT DOCUMENTS

| 8,195,394 | B1* | 6/2012 | Zhu et al. ....................... 701/514 |
| 2003/0138133 | A1* | 7/2003 | Nagaoka et al. ............... 382/104 |
| 2008/0130954 | A1 | 6/2008 | Taniguchi et al. |
| 2008/0260207 | A1 | 10/2008 | Nagaoka et al. |
| 2009/0240695 | A1* | 9/2009 | Angell et al. ..................... 707/7 |
| 2011/0199197 | A1* | 8/2011 | Takatsudo et al. ......... 340/425.5 |
| 2012/0062372 | A1* | 3/2012 | Augst ........................... 340/435 |

FOREIGN PATENT DOCUMENTS

| JP | 2003-284057 | A | 10/2003 |
| JP | 2007-310705 | A | 11/2007 |
| JP | 2008-021035 | A | 1/2008 |
| JP | 4173901 | B2 | 10/2008 |
| JP | 4267657 | B2 | 5/2009 |

\* cited by examiner

*Primary Examiner* — Gregory F Cunningham
(74) *Attorney, Agent, or Firm* — Carrier Blackman & Associates, P.C.; Joseph P. Carrier; William D. Blackman (57) ABSTRACT

When a pedestrian candidate and an animal candidate that are detected from an image imaged by an imaging device mounted in a vehicle are in a specified relationship in said image (such as existing nearby), the animal candidate is considered to be an item related to the pedestrian candidate, in other words, a pair object. Attention-arousing output directed at the animal candidate configuring the pair object is not generated. Therefore, a vehicle vicinity monitoring device is provided that reduces the frequency of attention-arousing directed at an animal (for ex-ample, a small animal such as a dog) being walked by a human.

5 Claims, 12 Drawing Sheets

(COMPARATIVE EXAMPLE)

FIG. 12

VEHICLE VICINITY MONITORING DEVICE

TECHNICAL FIELD

The present invention relates to a vehicle periphery monitoring apparatus (vehicle vicinity monitoring device) for monitoring the periphery of a vehicle using an image captured by an infrared camera (grayscale image) mounted on the vehicle.

BACKGROUND ART

As disclosed in Japanese Laid-Open Patent Publication No. 2003-284057 (hereinafter referred to as "JP2003-284057A"), it has heretofore been customary for a vehicle periphery monitoring apparatus to detect an object such as a pedestrian or the like that may possibly collide with a vehicle, from images (a grayscale image and a binary image converted therefrom) of the periphery of the vehicle, which are captured by infrared cameras, and to provide information about the detected object to the driver of the vehicle.

The vehicle periphery monitoring apparatus disclosed in JP2003-284057A detects, as an object, a high-temperature area in images in the periphery of the vehicle, which are captured by a set of left and right infrared cameras (stereo cameras), and calculates the distance up to the object by determining a parallax of the object in the left and right images. In addition, the vehicle periphery monitoring apparatus detects an object, such as a pedestrian or the like that is likely to affect the travel of the vehicle, i.e., that may possibly collide with the vehicle, based on the direction in which the object moves and the position of the object, and issues a warning concerning the detected object (see paragraphs [0014] and [0018] of JP2003-284057A).

Japanese Patent No. 4267657 (hereinafter referred to as "JP4267657B") discloses a vehicle periphery monitoring apparatus, which captures at least two images (two frames) of an object in the periphery of a vehicle at a predetermined time interval, using a single infrared camera mounted on the vehicle. If the size of a present image of the object changes from the size of a preceding image of the object, the change in size becomes greater as the relative speed between the object and the vehicle incorporating the vehicle periphery monitoring apparatus is higher. As the relative speed between the object and the vehicle is higher, an arrival time, which any object that is present in front of the vehicle takes to arrive at the vehicle, becomes shorter. Consequently, even though a single infrared camera is used, the vehicle periphery monitoring apparatus can monitor the periphery of the vehicle by estimating the arrival time from the rate of change between the sizes of images of the object that are captured at the predetermined time interval (see paragraphs [0006], [0007], and [0061] of JP4267657B).

Japanese Patent No. 4173901 (hereinafter referred to as "JP4173901B") discloses a vehicle periphery monitoring apparatus, which detects animals other than people from among objects, because objects that are present in the periphery of a vehicle and that may possibly collide with the vehicle are not limited to pedestrians. Large animals such as deer or the like may also be present on the road and may collide with the vehicle (see paragraph [0006] of JP4173901B).

SUMMARY OF INVENTION

JP4173901B cites large animals, such as deer or the like, as examples of objects that may possibly collide with the vehicle, and discloses a technology for detecting such large animals. However, small animals, such as dogs or the like, also exist as animals that may possibly collide with the vehicle.

According to the technology disclosed in JP4173901B, even in the case of a small animal such as a dog or the like that is present on a sidewalk, the vehicle periphery monitoring apparatus judges that such a small animal may possibly jump onto the street and collide with the vehicle, and issues a warning against the small animal, which is regarded as an object for which a warning is warranted.

Incidentally, in a situation in which a pedestrian (person) is taking a small animal for a walk along a side walk using a lead, if a vehicle approaches, then the pedestrian usually pulls on the lead in an effort to avoid a collision between the small animal and the vehicle.

According to the technology disclosed in JP4173901B, however, even in the absence of the possibility of a collision, if a small animal such as a dog or the like, the behavioral pattern of which cannot easily be predicted, is present on a side walk or the like, for example, then the vehicle periphery monitoring apparatus determines a motion vector of the dog or the like (see paragraph [0046] and [0047] of JP4173901B). Consequently, the vehicle periphery monitoring apparatus judges that there is a possibility that the small animals, which are even being taken for a walk by a pedestrian, may jump out and collide with the vehicle, recognizes the small animals as warning objects, and issues a warning. Consequently, the vehicle periphery monitoring apparatus tends to issue warnings quite frequently, which tends to be rather awkward for the driver of the vehicle. Hence, there is room for improvement.

In particular, a vehicle periphery monitoring apparatus, which has a wider warning object range for animals that move irregularly according to peculiar behavioral patterns than a warning object range for pedestrians (people) who are capable of intentionally avoiding vehicles, is highly likely to issue warnings with excessive frequency, even against animals that are being taken for a walk.

The present invention has been made in view of the aforementioned problems. It is an object of the present invention to provide a vehicle periphery monitoring apparatus, which calls the attention of the driver of a vehicle less frequently in the case of certain animals, e.g., small animals such as dogs or the like, which are taken for a walk by people.

According to the present invention, there is provided a vehicle periphery monitoring apparatus for monitoring the periphery of a vehicle using an image captured by an image capturing device mounted on the vehicle, comprising a pedestrian detection processor for detecting a pedestrian as an object to be monitored from the image, an animal detection processor for detecting an animal as an object to be monitored from the image, a pair object judgment processor for judging that the pedestrian and the animal, which are detected from the image, are a pair object if the pedestrian and the animal are in a predetermined relationship to each other, and an attention calling output generation judgment section for judging whether or not an attention calling output signal for calling attention of the driver of the vehicle should be generated, wherein, if the pair object judgment processor judges that the pedestrian and the animal are the pair object, the attention calling output generation judgment section does not generate the attention calling output signal for the animal of the pair object.

According to the present invention, in the image, if the pedestrian and the animal, which are detected from the image captured by the image capturing device mounted on the vehicle, are in the predetermined relationship, then the pedestrian and the animal are regarded as being related to each other, i.e., are regarded as a pair object. In this case, the animal of the pair object is regarded as an animal that is being supervised, i.e., an animal under the control of the pedestrian, and thus there is no need to call the attention of the driver, and an attention calling output signal is not generated for the animal. Consequently, the frequency of warnings or the like can be reduced, and the driver is less likely to become bothered by such warnings.

More specifically, in a situation in which the pedestrian is taking an animal for a walk, the animal is not regarded as an attention calling object.

The pair object judgment processor may judge that the pedestrian and the animal are a pair object if the pedestrian and the animal are present within a predetermined range. If a detected pedestrian and a detected animal are present within the predetermined range, it is highly possible that the pedestrian and the animal are a pair object and can be regarded as such. Therefore, with a simple arrangement, the pair object judgment processor can judge that the pedestrian and the animal are a pair object.

The pair object judgment processor may judge that the pedestrian and the animal are a pair object if a height of the animal is smaller than a height of the pedestrian. If the height of a detected animal is smaller than the height of a detected pedestrian, then it is highly possible that the pedestrian and the animal are a pair object. Therefore, the pair object judgment processor can judge that the pedestrian and the animal are a pair object with high accuracy.

The pair object judgment processor may judge that the pedestrian and the animal are a pair object if a string is detected between the pedestrian and the animal. If a string (lead) is detected between a detected animal and a detected pedestrian, then it is highly possible that the animal and the pedestrian are a pair object made up of a dog and a pedestrian pulling a string that is connected to the dog. Therefore, the pair object judgment processor can judge that the pedestrian and the animal are a pair object with high accuracy.

The vehicle periphery monitoring apparatus may further include a display for displaying an image based on the attention calling output signal, and the attention calling output signal may represent a single frame surrounding the pair object on the display for thereby calling the attention of the driver. For calling the attention of the driver, the pair object is surrounded by a single frame on the display. Therefore, the driver can recognize at a glance the pedestrian together with the animal, which is in a predetermined relationship to the pedestrian.

According to the present invention, in the image, if the pedestrian and the animal, which are detected from the image captured by the image capturing device mounted on the vehicle, are in the predetermined relationship, then the pedestrian and the animal are regarded as being related to each other, i.e., are regarded as a pair object. In this case, the animal of the pair object is regarded as an animal that is being supervised, i.e., an animal under the control of the pedestrian, and thus there is no need to call the attention of the driver, and an attention calling output signal is not generated for the animal. Consequently, the driver is less likely to become bothered by frequent warnings in relation to the animal.

DESCRIPTION OF EMBODIMENTS

A vehicle periphery monitoring apparatus according to a preferred embodiment of the present invention will be described below with reference to the accompanying drawings.

Figure 1:
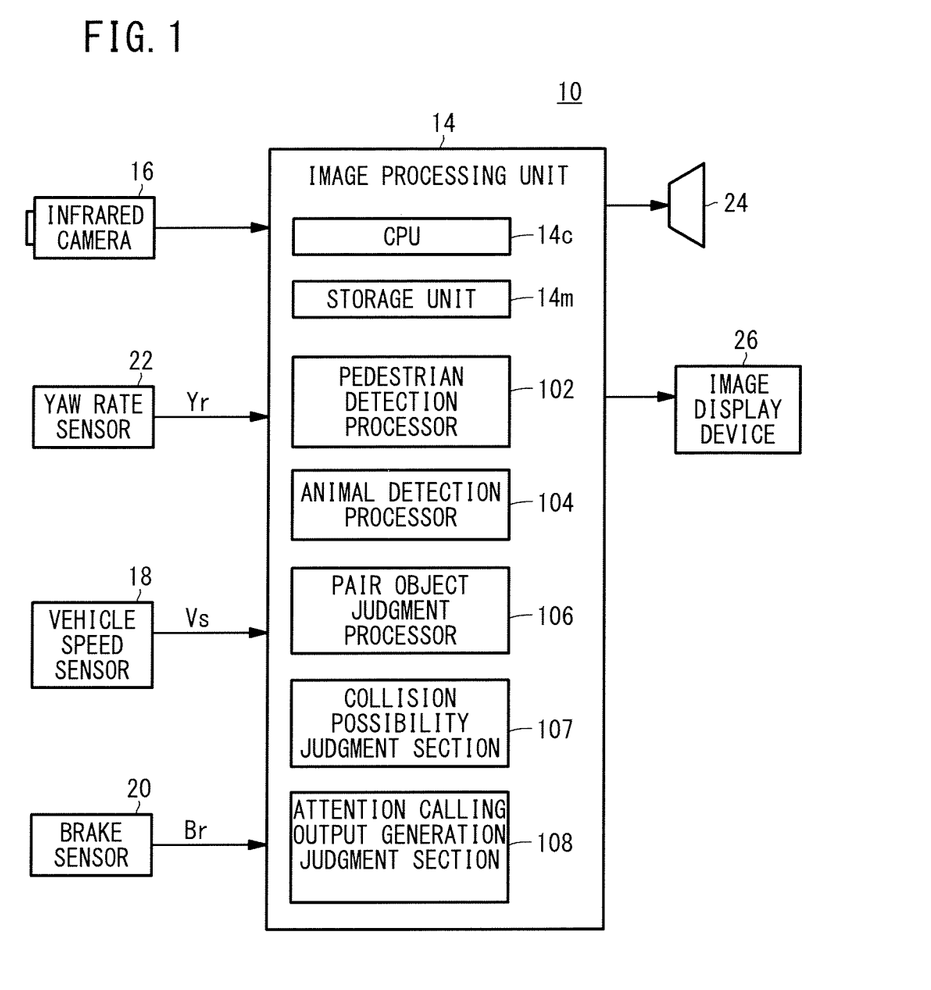
FIG. 1 is a block diagram showing a configuration of a vehicle periphery monitoring apparatus according to an embodiment of the present invention.
Figure 2:
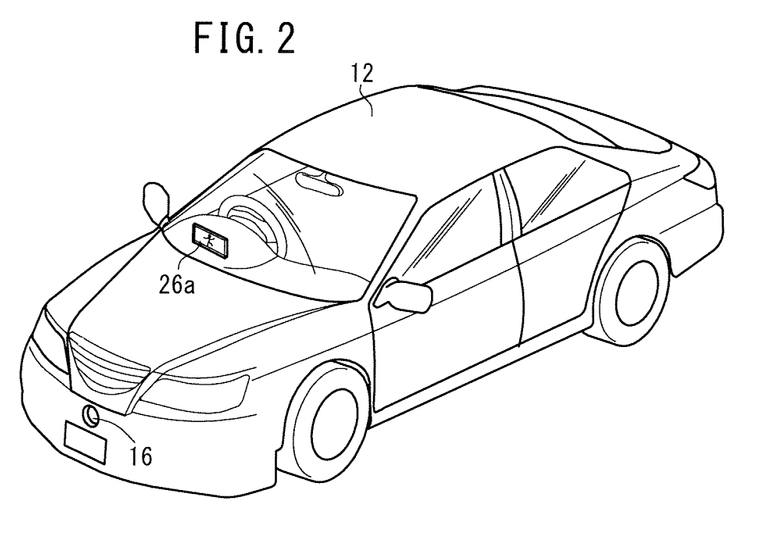
FIG. 2 is a perspective view of a vehicle that incorporates therein the vehicle periphery monitoring apparatus shown in FIG. 1.

FIG. 1 shows in block form the configuration of a vehicle periphery monitoring apparatus 10 according to an embodiment of the present invention. FIG. 2 shows in perspective a vehicle 12 that incorporates therein the vehicle periphery monitoring apparatus 10 shown in FIG. 1.

As shown in FIGS. 1 and 2, the vehicle periphery monitoring apparatus 10 has an image processing unit 14 for controlling the vehicle periphery monitoring apparatus 10, a single (monocular) infrared camera 16 (image capturing device) connected to the image processing unit 14, a vehicle speed sensor 18 for detecting a vehicle speed Vs of the vehicle 12, a brake sensor 20 for detecting a manipulated variable Br of a brake pedal (brake manipulated variable) that is operated by the driver of the vehicle 12, a yaw rate sensor 22 for detecting a yaw rate Yr of the vehicle 12, a speaker 24 for issuing an audible warning in the form of speech or the like, and an image display device 26, which comprises a HUD (Head Up Display) 26a, for displaying images captured by the infrared camera 16 in order to enable the driver of the vehicle 12 to recognize an object such as a pedestrian or the like (moving object) that is in great danger of colliding with the vehicle 12.

The image display device 26 is not limited to the HUD (Head Up Display) 26a, but may comprise a display device for displaying a map of a navigation system that is mounted in the vehicle 12, or a display device (multi-information display device) in the form of a meter unit or the like for displaying mileage, etc.

The image processing unit 14 detects an object to be monitored such as a pedestrian, an animal, or the like in front of the vehicle 12 based on an infrared image of the periphery of the vehicle 12 together with various signals, which according to the present invention represent the vehicle speed Vs, the brake manipulated variable Br, and the yaw rate Yr, thereby representing a traveling state of the vehicle 12. If the image processing unit 14 judges that there is a strong possibility that the vehicle 12 will collide with the monitored object, the image processing unit 14 issues a warning, e.g., a beeping sound, from the speaker 24, and displays the monitored objected in a captured image, which is displayed on the HUD 26a as a grayscale image. The monitored object is surrounded by a distinct color frame, which may be yellow, red, or the like, thereby calling the attention of the driver.

The image processing unit 14 includes an input circuit such as a A/D converter circuit, etc., for converting an input analog signal into a digital signal, an image memory (storage unit 14m) for storing a digital image signal, a CPU (Central Processing Unit) 14c for performing various processing operations, a storage unit 14m including a RAM (Random Access Memory), which is used to store data processed by the CPU 14c, and a ROM (Read Only Memory), which is used to store a program executed by the CPU 14c together with tables, maps, and templates, a clock and timer, and an output circuit for supplying a drive signal for the speaker 24 and a display signal for the image display device 26. The templates include pedestrian (human body) shaped templates, i.e., rightward, leftward, forward (and backward), and animal shaped templates, i.e., rightward, leftward, forward (and backward) for deer, dogs, etc. The infrared sensor 16, the yaw rate sensor 22, the vehicle speed sensor 18, and the brake sensor 20 supply output signals, respectively, to the image processing unit 14. The output signals are converted by the input circuit into digital signals, which are supplied to the CPU 14c.

The CPU 14c of the image processing unit 14 reads the digital signals supplied thereto, executes the program while referring to the tables, the maps, and the templates, thereby functioning as various functioning means (also referred to as functioning sections), and supplies drive signals, i.e., speech and display signals, to the speaker 24 and the image display device 26. Such functions may also be implemented by way of hardware.

According to the present embodiment, the image processing unit 14 has, as the aforementioned functioning means or sections referred to above, a pedestrian detection processor 102, an animal detection processor 104, a pair object judgment processor 106, a collision possibility judgment section 107, and an attention calling output generation judgment section 108. Specific details of such features will be described respectively below.

Basically, the image processing unit 14 executes an object recognition processing (object detection processing) program for recognizing an object by comparing an image acquired by the infrared camera 16 with pattern templates representing human body shapes, animal shapes, vehicle shapes, and artificial structure shapes, which are stored in the storage unit 14m.

As shown in FIG. 2, the infrared camera 16 is mounted on the front bumper of the vehicle 12 at a central position in the transverse direction of the vehicle 12. The infrared camera 16 has characteristics such that, as the temperature of an object the image of which is captured by the infrared camera 16 is higher, the output signal (captured image signal) of the infrared camera 16 exhibits a higher level, i.e., a higher brightness level.

The HUD 26a is arranged so as to display a screen on the front windshield of the vehicle 12 at a position that does not obstruct the field of vision of the driver seated on the driver's seat in the vehicle 12.

The image processing unit 14 performs functions in order to convert an analog video signal, which is generated by the infrared camera 16, into digital data at a frame clock interval or period of several tens ms, e.g., 1 second per 30 frames [ms], to store the digital data in the storage unit 14m (image memory), and to carry out various processing operations on images in front of the vehicle 12, which are stored in the storage unit 14m.

The pedestrian detection processor 102 and the animal detection processor 104 extract an image segment of an object to be monitored from the image in front of the vehicle 12, which is stored in the storage unit 14m. The attention calling output generation judgment section 108 causes the collision possibility judgment section 107 to calculate a rate of change Rate between sizes of image segments of the same object, which are monitored from the images that are captured at the frame clock interval or period (predetermined time interval). In addition, using the rate of change Rate, the collision possibility judgment section 107 estimates the time taken by the monitored object until the object arrives at the vehicle 12, calculates the position of the monitored object in actual space, and calculates a motion vector of the monitored object in actual space.

As disclosed in JP4267657B, the time TTC (Time To Contact or Time To Collision) taken until the monitored object arrives at the vehicle 12, also referred to as a "collision margin time", or stated otherwise, the time TTC taken until the vehicle 12 collides with the monitored object, can be determined from the rate of change Rate (determined from the image), and an image capturing interval (frame clock period) dT (known), which is a predetermined time interval, according to the following equation (1).

$$TTC=dT \times Rate/(1-Rate) \qquad (1)$$

The rate of change Rate can be determined from the ratio of the width or length W0, which may be stored as a number of respective pixels, of the monitored object in the previously captured image to the ratio of the width or length W1 (pixel number) of the monitored object in the presently captured image (Rate=W0/W1).

The attention calling output generation judgment section 108 further causes the collision possibility judgment section 107 to calculate the collision margin time TTC, and positional changes Δx (horizontal), Δy (vertical) between image segments of the same monitored object from the images that are captured at the predetermined time interval. In addition, the collision possibility judgment section 107 judges a possibility that the monitored object and the vehicle 12 may collide with each other based on the calculated positional changes (motion vectors) Δx, Δy.

The pair object judgment processor 106 judges whether or not a pedestrian and an animal in the image segment of the monitored object, which is extracted from the image in front of the vehicle 12 that is stored in the storage unit 14m, make up a pair object, in which the relationship between the pedestrian and the animal, i.e., how the pedestrian and the animal are related to each other, is of a predetermined relationship, as will be described later. In this manner, the pair object judgment processor 106 makes a judgment as to whether or not the animal is under the supervision, i.e., under the control, of the pedestrian, i.e., whether the animal is being taken for a walk, and thus there is no need to call the attention of the driver.

The vehicle periphery monitoring apparatus 10 is constructed and operates basically as described above. Detailed operations of the vehicle periphery monitoring apparatus 10 will be described below with reference to the flowchart shown in FIG. 3.

Figure 3:
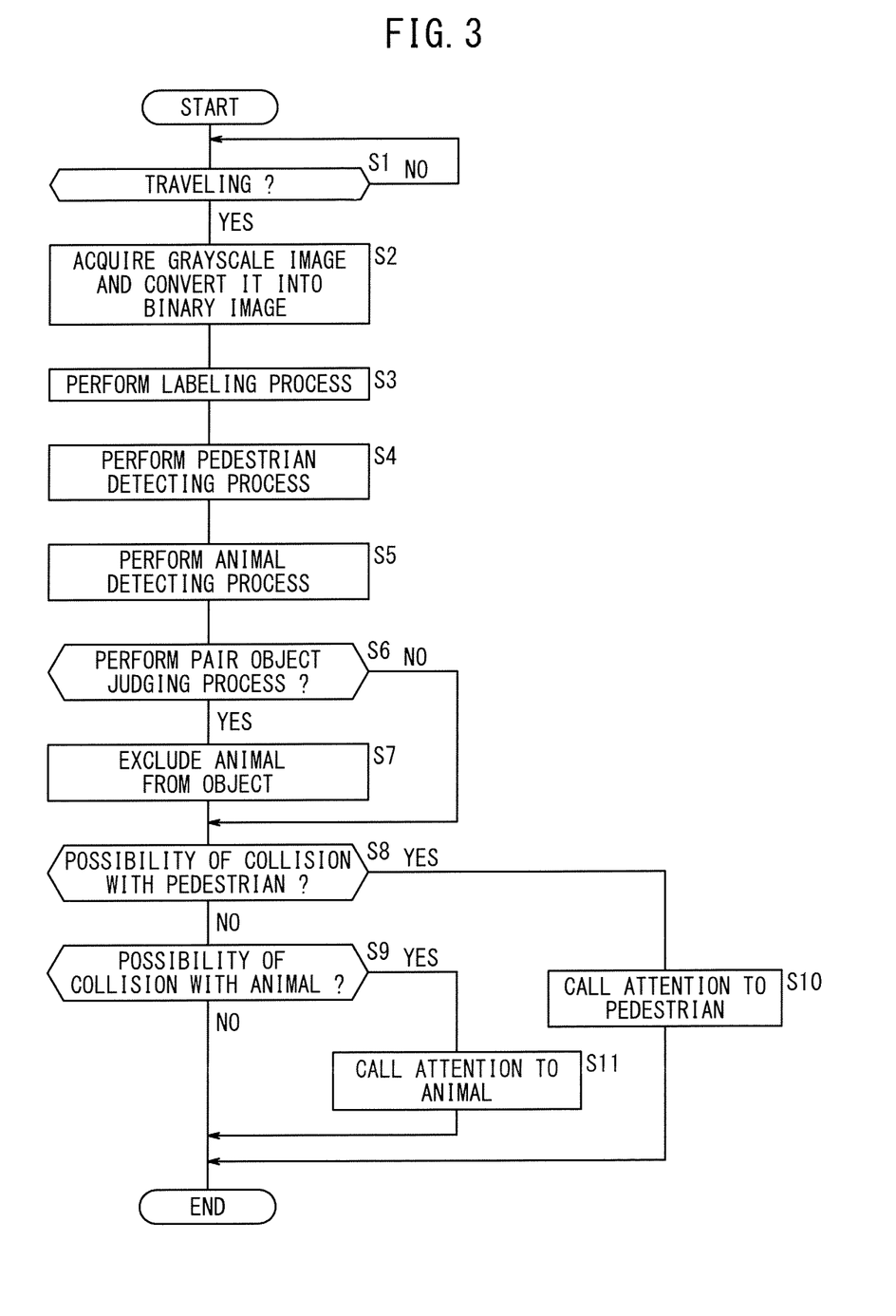
FIG. 3 is a flowchart of an operation sequence of an image processing unit of the vehicle periphery monitoring apparatus.

First, in step S1, the image processing unit 14 judges the traveling state of the vehicle 12, i.e., whether the vehicle 12 is traveling or is at rest, from the vehicle speed Vs detected by the vehicle speed sensor 18. If the vehicle 12 is at rest (step S1: NO), then the operation sequence shown in FIG. 3 is stopped.

If the vehicle 12 is traveling (step S1: YES), then in step S2, the image processing unit 14 acquires a captured infrared image, which is represented by an analog image signal generated by the infrared camera 16 in each frame within a predetermined angular field in front of the vehicle 12. The image processing unit 14 converts the analog image signal into a digital image signal, which represents a grayscale image, stores the grayscale image in the image memory (storage unit 14m), carries out a binarizing process for converting the grayscale image into a binary image, in which areas brighter than a predetermined brightness threshold value are represented by a pixel value of "1" (white) and areas darker than the predetermined brightness threshold value are represented by a pixel value of "0" (black), and then stores the binary image in each frame in the storage unit 14m. In the binarizing process, a cluster (human object candidate) of a head, shoulders, a torso, and two legs is detected as a cluster of pixel values of "1" (set). Further, a cluster (animal object candidate) of a head, a torso, a tail, and four legs also is detected as a cluster of pixel values of "1" (set), for animals (four-footed animals in this embodiment) such as dogs (small animals) and deer (large animals).

In step S3, the image processing unit 14 carries out a labeling process that converts the pixels having values of "1" (white) of the binary image in each frame (image) into run-length data for each scanning line along the x direction (horizontal direction), while regarding lines having overlapping portions along the y direction (vertical direction) as an object. In addition, the image processing unit 14 applies labels to rectangles circumscribing such objects. For example, a circumscribing rectangle is labeled as an object candidate area 52 in FIG. 4, and a circumscribing rectangle is labeled as an object candidate area 152 in FIG. 5.

In step S4, the pedestrian detection processor 102 carries out a pedestrian detection process for detecting a pedestrian as an object. In step S5, the animal detection processor 104 carries out an animal detection process for detecting an animal as an object.

Figure 4:
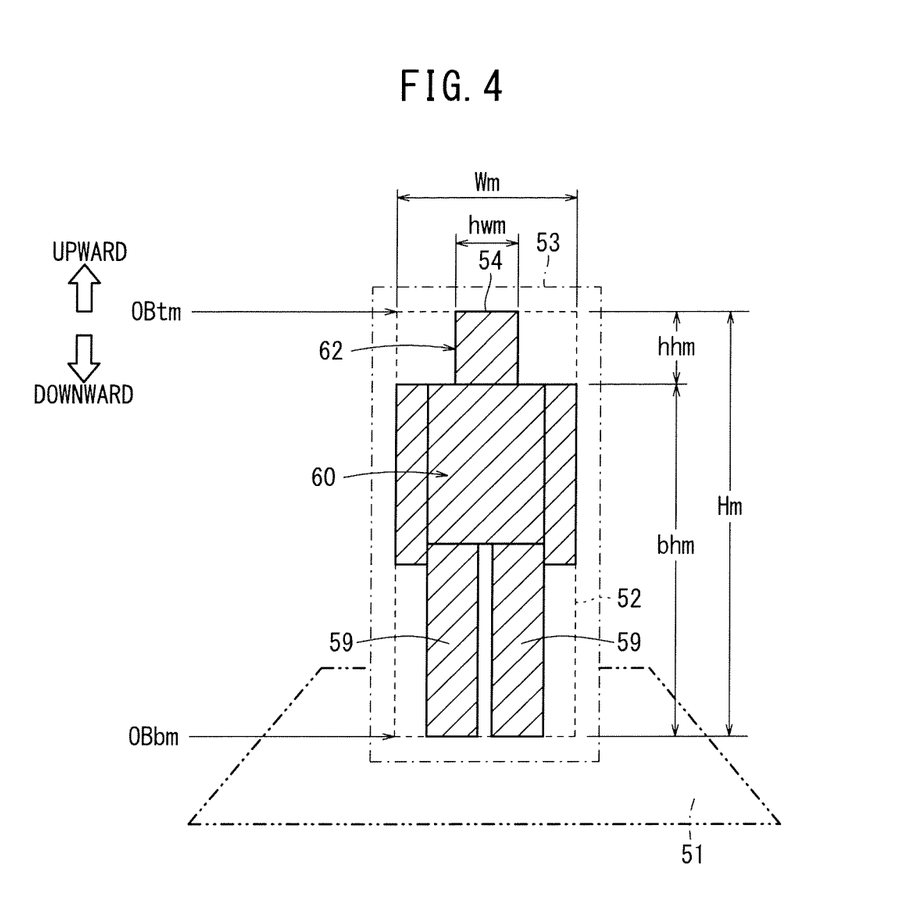
FIG. 4 is a diagram showing an image of a pedestrian, which is used in a pedestrian detecting process.

More specifically, first, in step S4, the pedestrian detection processor 102 scans, downwardly and from the left to the right, pixel values in a mask area 53, which is shown as a dot-and-dash-line area in FIG. 4. The mask area 53 is slightly larger than the labeled object candidate area 52. If the pedestrian detection processor 102 detects a succession of pixel values "0" in a darker area, then the pedestrian detection processor 102 determines the detected pixels to be a boundary between a pedestrian candidate 62, which is made up of a head 54, a torso 60, and legs 59, and a road surface 51 in the image, and regards the boundary as a lower end OBbm of the object.

Further, in step S4, the pedestrian detection processor 102 scans, upwardly from the lower end OBbm of the object and from the left to the right, pixel values in the mask area 53. If the pedestrian detection processor 102 detects a zone in which a horizontal brightness edge (the top of the head 54) changes vertically, i.e., a zone in which there is an essential succession of vertical pairs of pixels of values "1" and "0" in the binary image, then the pedestrian detection processor 102 determines the detected zone to be an edge of a boundary between the pedestrian candidate 62 and the background, and regards the boundary edge as an upper end OBtm of the object.

Figure 5:
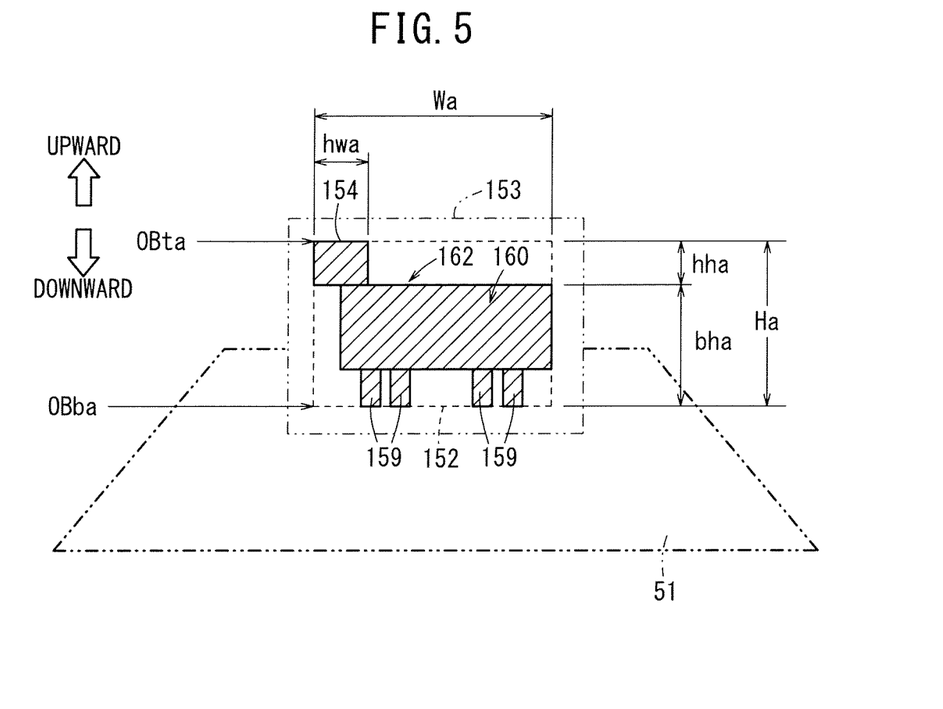
FIG. 5 is a diagram showing an image of an animal, which is used in an animal detecting process.

Similarly, in step S5, the animal detection processor 104 scans, downwardly and from the left to the right, pixel values in a mask area 153, which is shown as a dot-and-dash-line area in FIG. 5. The mask area 153 is slightly larger than the labeled object candidate area 152. If the animal detection processor 104 detects a succession of pixel values "0" in a darker area, then the animal detection processor 104 determines the detected pixels to be a boundary between an animal candidate 162, which is made up of a head 154, a torso 160, and legs 159, and the road surface 51 in the image, and regards the boundary as a lower end OBba of the object.

Further, in step S5, the animal detection processor 104 scans, upwardly from the lower end OBba of the object and from the left to the right, pixel values in the mask area 153. If the animal detection processor 104 detects a zone in which a horizontal brightness edge (the top of the head 154) changes vertically, i.e., a zone in which there is an essential succession of vertical pairs of pixels of values "1" and "0" in the binary image, then the animal detection processor 104 determines the detected zone to be an edge of a boundary between the animal candidate 162 and the background, and regards the boundary edge as an upper end OBta of the object.

There are various ways of judging whether an object candidate is a pedestrian candidate 62 (FIG. 4) or an animal candidate 162 (FIG. 5). For example, a pedestrian candidate 62 has a height Hm (Hm=OBtm−OBbm, wherein units thereof are represented by a number of pixels), whereas an animal candidate 162 has a height Ha (Ha=OBta−OBba, wherein units thereof are represented by a number of pixels). If the height of an object candidate is greater than the height Ha, the object candidate is judged as a pedestrian candidate 62. According to another example, an object candidate may be judged as a pedestrian candidate 62 or an animal candidate 162 by comparing the ratio of head heights hhm, hha to torso heights bhm, bha with respective threshold values. Typically, the ratio hhm/bhm (=head height/torso height) of a pedestrian (human body) is smaller than the ratio hha/bha (=head height/torso height) of an animal such as a dog or the like. If four legs (legs 159) are detected, then the object candidate with four legs may be judged as an animal candidate 162, and if two legs (legs 59) are detected, then the object candidate with two legs may be judged as a pedestrian candidate 62. If an object candidate is determined to be facing sideways, then the object candidate may be judged as a pedestrian candidate 62 or an animal candidate 162 based on the ratio of head widths hwm, hwa to entire widths Wm, Wa (the ratio of hwm/Wm=head width/torso width or the ratio of hwa/Wa=head width/entire width).

In step S6, as described below, the pair object judgment processor 106 judges whether or not the pedestrian candidate 62 detected in step S4 and the animal candidate 162 detected in step S5, which are detected from the same image, qualify as a pair object Pobj.

The pair object judgment processor 106 judges that the pedestrian candidate 62 and the animal candidate 162, which are detected from the same image, are a pair object Pobj if the pedestrian candidate 62 and the animal candidate 162 are of a predetermined relationship in the image.

The predetermined relationship will be described in specific detail below. The pair object judgment processor 106 judges that the pedestrian candidate 62 and the animal candidate 162 are a pair object Pobj if at least one of first through fifth judgment conditions is satisfied.

According to the first judgment condition, the pair object judgment processor 106 judges that the pedestrian candidate 62 and the animal candidate 162 are a pair object Pobj if the difference |Dm−Da| between the distance Dm from the vehicle 12 to the pedestrian candidate 62 and the distance Da from the vehicle 12 to the animal candidate 162 and the horizontal distance |Pm−Pa| between the position (center of gravity) Pm of the pedestrian candidate 62 and the center of gravity Pa of the animal candidate 162 are equal to or smaller than respective threshold distances Dth, Pth (|Dm−Da|≤Dth, |Pm−Pa|≤Pth). The threshold distance Pth for the horizontal distance |Pm−Pa| may be of different values for different types of animals. In other words, according to the first judgment condition, the pair object judgment processor 106 judges that the pedestrian candidate 62 and the animal candidate 162 are a pair object Pobj if the pedestrian candidate 62 and the animal candidate 162 are generally at the same distance from the vehicle 12 and are presently in close proximity to each other. Further, the pair object judgment processor 106 judges that the pedestrian candidate 62 and the animal candidate 162 are not a pair object Pobj if the pedestrian candidate 62 and the animal candidate 162 are generally not at the same distance from the vehicle 12 and are not presently in close proximity to each other.

The second through fifth judgment conditions will be described below with reference to actual captured images.

Figure 6:
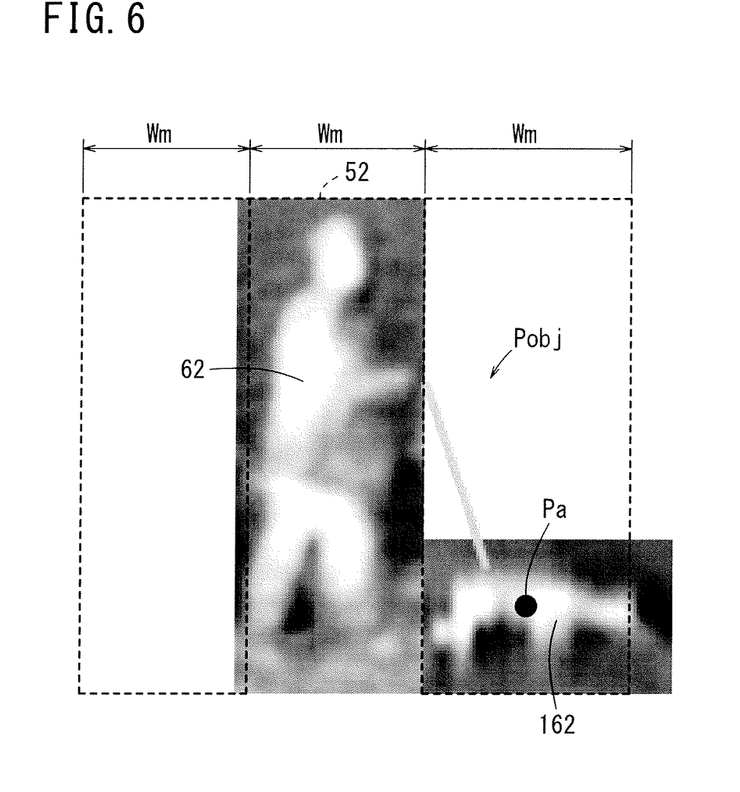
FIG. 6 is a diagram illustrating an extracting condition for a pair object.

According to the second judgment condition, the pair object judgment processor 106 judges that the pedestrian candidate 62 and the animal candidate 162 are a pair object Pobj if, as shown in FIG. 6, the center of gravity Pa of the animal candidate 162 is present in an area on the left or right having the width Wm of the object candidate area 52 having the width Wm, which is represented by a rectangle circumscribing the pedestrian candidate 62 in the image (grayscale image or binary image). In other words, according to the second judgment condition, the pair object judgment processor 106 judges whether or not the pedestrian candidate 62 and the animal candidate 162 are a pair object Pobj depending on whether the pedestrian candidate 62 and the animal candidate 162 are present in the vicinity of the same position.

Figure 7:
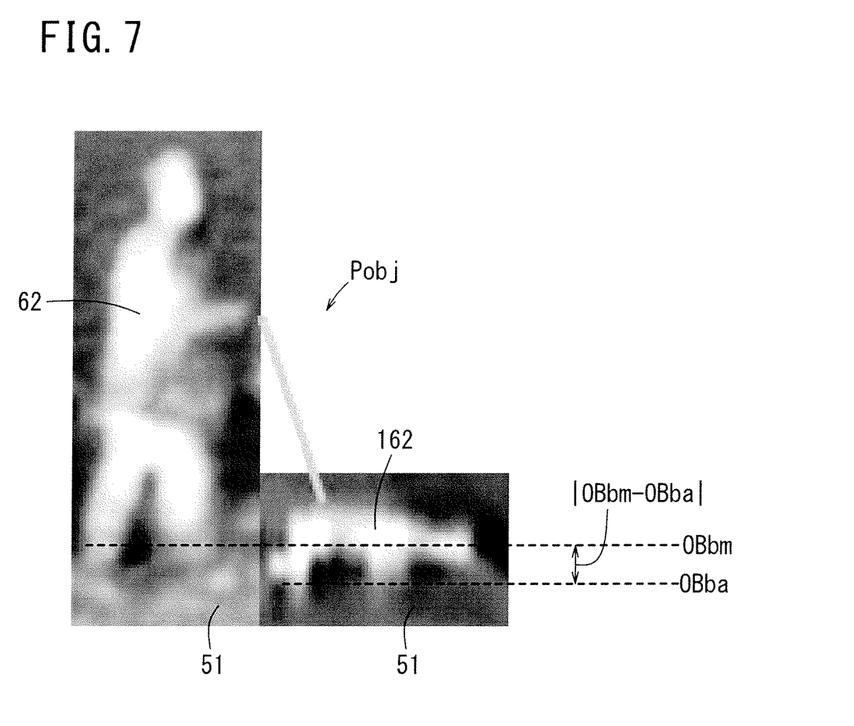
FIG. 7 is a diagram illustrating another extracting condition for a pair object.

According to the third judgment condition, the pair object judgment processor 106 judges that the pedestrian candidate 62 and the animal candidate 162 are a pair object Pobj if, as shown in FIG. 7, the difference |Bbm−OBba| between the lower end OBbm and the lower end OBba is equal to or smaller than a threshold value OBth (|Bbm−OBba|≤OBth). The lower end OBbm is defined as the boundary (point of intersection) between the pedestrian candidate 62 and the road surface 51. The lower end OBba is defined as the boundary (point of intersection) between the animal candidate 162 and the road surface 51. In other words, according to the third judgment condition, the pair object judgment processor 106 judges whether or not the pedestrian candidate 62 and the animal candidate 162 are a pair object Pobj depending on whether the distances of the pedestrian candidate 62 and the animal candidate 162 from the vehicle 12 are in the vicinity of the same distance.

Figure 8:
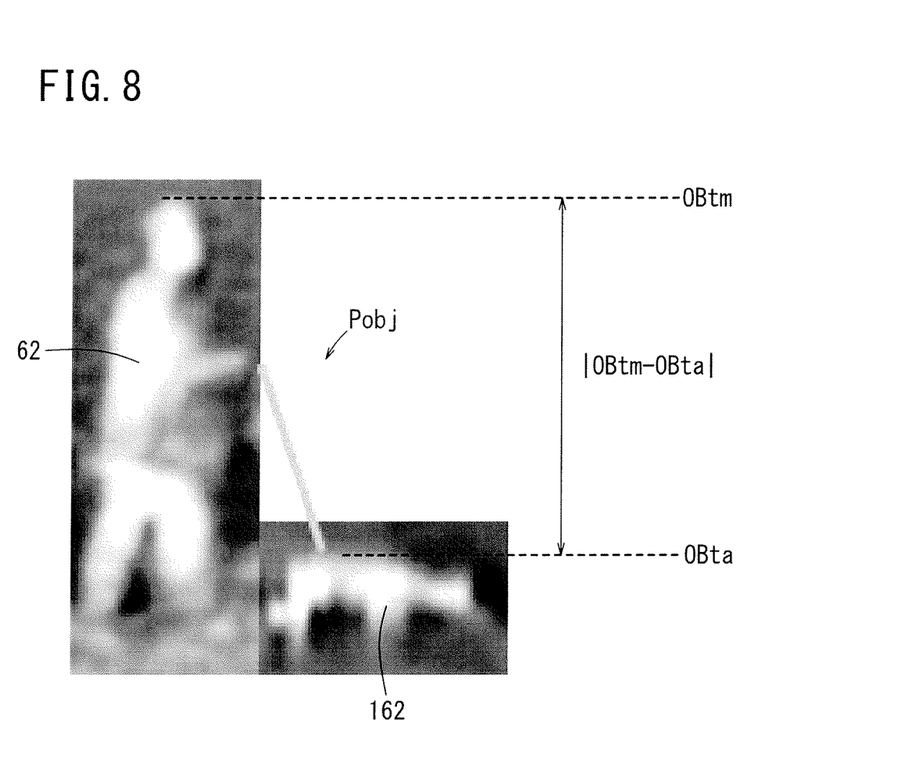
FIG. 8 is a diagram illustrating still another extracting condition for a pair object.

According to the fourth judgment condition, the pair object judgment processor 106 judges that the pedestrian candidate 62 and the animal candidate 162 are a pair object Pobj if, as shown in FIG. 8, the difference |Btm−OBta| between the upper end OBtm of the pedestrian candidate 62 and the upper end OBta of the animal candidate 162 is equal to or greater than a threshold value Hth, which is ½ of the height Hm of the pedestrian candidate 62, for example, (|Btm−OBta|≥Hth). The fourth judgment condition is based on the premise that the height Ha of an animal such as a dog or the like that is being taken for a walk by a pedestrian is smaller than the height Hm of a human being.

Figure 9:
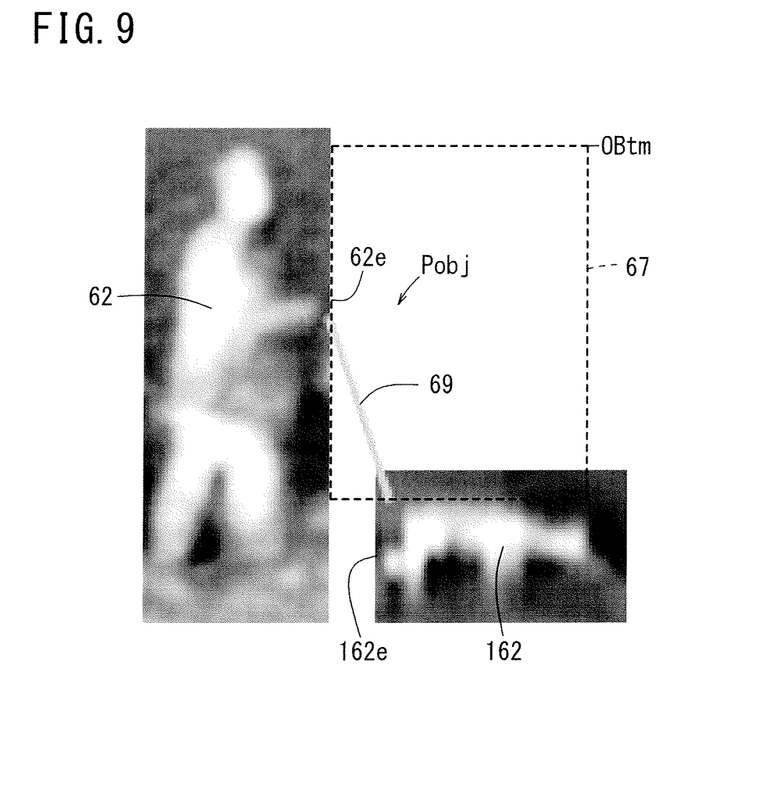
FIG. 9 is a diagram illustrating yet another extracting condition for a pair object.

According to the fifth judgment condition, the pair object judgment processor 106 judges that the pedestrian candidate 62 and the animal candidate 162 are a pair object Pobj if, as shown in FIG. 9, there is a profile, or a lead (string) 69, which is present in an upper area 67 above the animal candidate 162 between the pedestrian candidate 62 and the animal candidate 162, or if there is a pair of edges 62e (the tip end of a hand of the pedestrian candidate 62 in FIG. 9) and 162e (the tip end of the tail of the animal candidate 162 in FIG. 9) present between the pedestrian candidate 62 and the animal candidate 162.

In step S6, as described above, the pair object judgment processor 106 judges whether or not the pedestrian candidate 62 detected in step S4 and the animal candidate 162 detected in step S5, which are detected from the same image, qualify as a pair object Pobj.

If the pair object judgment processor 106 judges in step S6 that there is a pair object Pobj present in the image (step S6: YES), then the attention calling output generation judgment section 108 regards the animal candidate 162 of the pair object Pobj as an animal under the supervision of the pedestrian, and in step S7, excludes the animal candidate 162 from objects to which the attention of the driver should be called. In other words, with respect to the animal candidate 162 of the pair object Pobj, it will not be judged in step S9 that there is a possibility of collision between the vehicle 12 and the animal. As a result, with respect to the animal candidate 162 of the pair object Pobj, the attention calling output generation judgment section 108 does not generate an attention calling output signal such as a warning or the like.

Next, in step S8, the attention calling output generation judgment section 108 causes the collision possibility judgment section 107 to judge a possibility of collision with the pedestrian candidate 62 of the pair object Pobj (step S6: YES) and a possibility of collision with the pedestrian candidate 62 that is not in a predetermined relation with respect to the animal candidate 162 (not under the first through fifth judgment conditions described above) (step S6: NO), and in step S9, to judge a possibility of collision with the animal candidate 162 that does not make up the pair object Pobj.

More specifically, the collision possibility judgment section 107 judges whether or not there is a possibility of collision of the vehicle 12 with the pedestrian candidate 62 and the animal candidate 162 in view of the collision margin time TTC, which is determined according to equation (1) with regard to the pedestrian candidate 62 and the animal candidate 162, and motion vectors of the pedestrian candidate 62 and the animal candidate 162, and based on the brake manipulated variable Br, the vehicle speed Vs, and the yaw rate Yr, which are detected respectively by the brake sensor 20, the vehicle speed sensor 18, and the yaw rate sensor 22. If the collision possibility judgment section 107 judges that there is a possibility of collision (step S8: YES, step S9: YES), then in step S10 and step S11, the attention calling output generation judgment section 108 generates an attention calling output signal, thereby calling the attention of the driver of the vehicle 12 (and providing information to the driver). More specifically, the attention calling output generation judgment section 108 displays a grayscale image of the pedestrian and/or the animal on the HUD 26a, and issues a warning through the speaker 24 in order to prompt the driver and avoid a collision.

Figure 10:
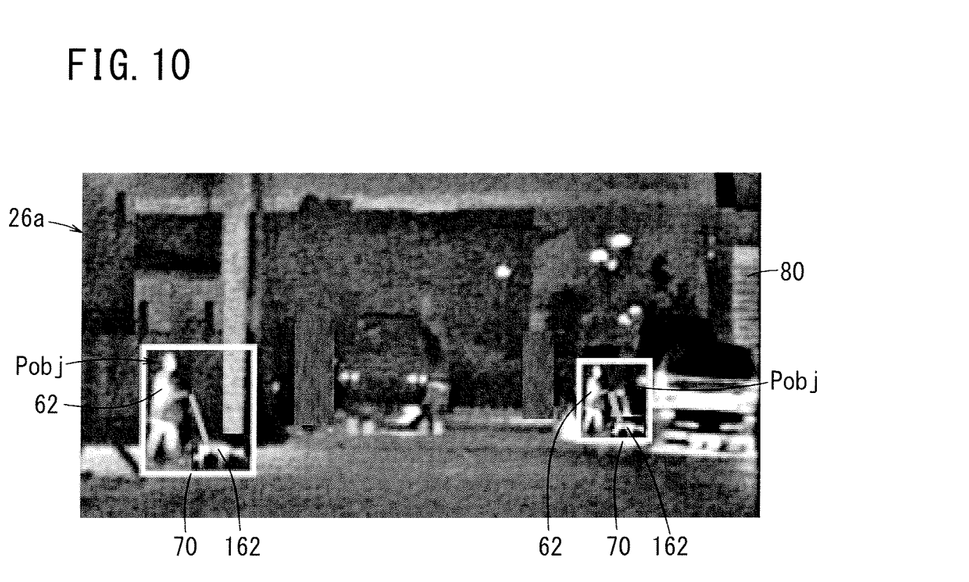
FIG. 10 is a diagram illustrating a displayed image displayed according to the present embodiment.

In this case, according to the present embodiment, the attention calling output generation judgment section 108 generates an output signal for displaying a grayscale image 80 on the HUD 26a, as shown in FIG. 10. The grayscale image 80 includes pair objects Pobj, each of which is made up of a pedestrian candidate 62 and an animal candidate 162 surrounded by a single frame 70, which is generally in the form of a circumscribing rectangle of a distinct color such as yellow, red, or the like for calling the attention of the driver.

[Overview of the Embodiment]

As described above, the vehicle periphery monitoring apparatus 10 according to the present embodiment detects an object for which there is no need to call the attention of the driver in an image that is captured by a single infrared camera 16 mounted on the vehicle 12.

The vehicle periphery monitoring apparatus 10 includes the pedestrian detection processor 102 for detecting a pedestrian candidate 62 (pedestrian) as an object to be monitored in the captured image, the animal detection processor 104 for detecting an animal candidate 162 (animal) as an object to be monitored in the captured image, the pair object judgment processor 106 for judging that the pedestrian candidate 62 and the animal candidate 162, which are detected from the image, are a pair object Pobj if the pedestrian candidate 62 and the animal candidate 162 are in a predetermined relationship to each other, and the attention calling output generation judgment section 108 for judging whether or not an attention calling output signal for calling the attention of the driver of the vehicle 12 should be generated.

If the pair object judgment processor 106 judges that the pedestrian candidate 62 and the animal candidate 162 are a pair object Pobj, then the attention calling output generation judgment section 108 does not generate the attention calling output signal for the animal candidate 162 of the pair object Pobj.

With the above arrangement, if the pedestrian candidate 62 and the animal candidate 162, which are detected from the image captured by the infrared camera 16, are in a predetermined relationship in the image, then the pedestrian candidate 62 and the animal candidate 162 are regarded as being related to each other, i.e., are a pair object Pobj. The animal candidate 162 of the pair object Pobj is regarded as an animal candidate 162 that is under the supervision, i.e., under the control, of the pedestrian. Thus, there is no need to call the attention of the driver, and an attention calling output signal is not generated for the animal candidate 162. Consequently, the driver is less likely to become bothered by the animal candidate 162.

More specifically, the vehicle periphery monitoring apparatus 10, which has both an animal detecting capability and a pedestrian (human) detecting capability, does not regard an animal such as a dog or the like as an attention calling object (including an object for which a warning should be issued) if the animal is being taken for a walk by a pedestrian. Consequently, the driver is not required to pay unnecessary attention to the animal, and hence is less likely to become bothered by the animal.

Figure 11:
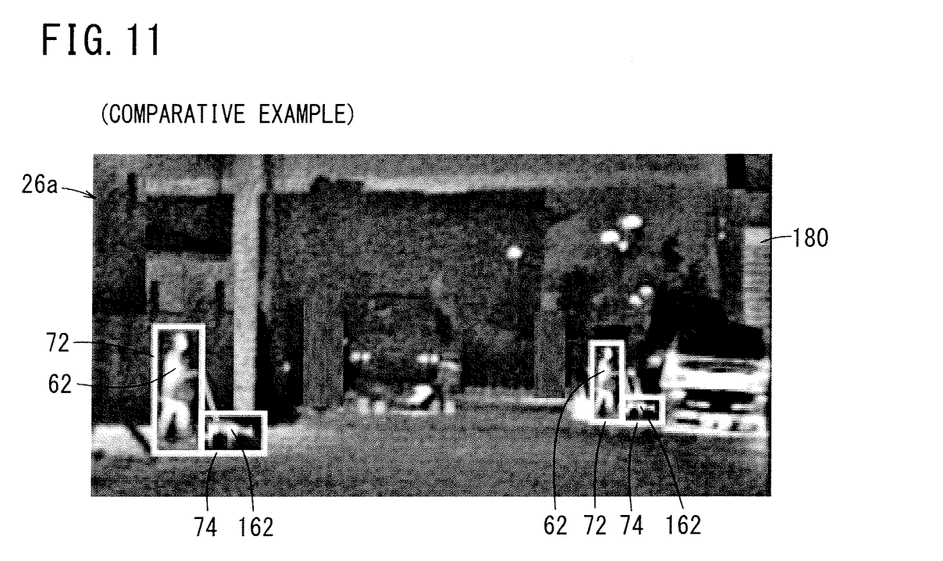
FIG. 11 is a diagram illustrating a displayed image displayed according to a comparative example.

FIG. 11 shows a grayscale image 180 according to a comparative example, which is similar to the grayscale image 80 shown in FIG. 10 according to the present embodiment. In the grayscale image 180 according to the comparative example, a judgment is not made as to whether or not a pedestrian candidate and an animal candidate are a pair object Pobj, and pedestrian candidates 62 and animal candidates 162 are surrounded by respective frames 72, 74. According to the comparative example, a warning is issued for the animal candidates 162 of pair objects Pobj, for which there actually is not a need to call the attention of the driver by issuing a warning or the like. In this situation, all too often, the driver feels bothered by such warnings.

In this case, according to the present embodiment, if a detected pedestrian candidate 62 and a detected animal candidate 162 are present in a predetermined range, then it is highly possible that the animal and the pedestrian are a pair object Pobj and can be regarded as such. Therefore, with a simple arrangement, the pair object judgment processor 106 is capable of judging that the pedestrian candidate 62 and the animal candidate 162 are a pair object Pobj.

If the height Ha of a detected animal candidate 162 is smaller than the height Hm of a detected pedestrian candidate 62 (Ha<Hm), then it is highly possible that the pedestrian candidate 62 and the animal candidate 162 are a pair object Pobj. Therefore, the pair object judgment processor 106 is capable of judging with high accuracy that the pedestrian candidate 62 and the animal candidate 162 are a pair object Pobj.

If a lead (string) 69 is detected between a detected animal candidate 162 and a detected pedestrian candidate 62, then it is highly possible that the animal and the pedestrian are a pair object Pobj made up of a dog and a pedestrian pulling a string connected to the dog. Therefore, the pair object judgment processor 106 is capable of judging with high accuracy that the pedestrian candidate 62 and the animal candidate 162 are a pair object Pobj.

Furthermore, the vehicle periphery monitoring apparatus 10 includes the image display device 26 such as the HUD 26a for displaying an image based on the attention calling output signal. The attention calling output signal represents a single frame (detection frame) 70 (see FIG. 10), which surrounds a pair object Pobj on the HUD 26a, for calling the attention of the driver. Therefore, the driver can recognize at a glance the pedestrian together with the animal, which is in a predetermined relationship with respect to the pedestrian.

The present invention is not limited to the above embodiment, but may employ various arrangements based on the content disclosed in the present specification.

Figure 12:
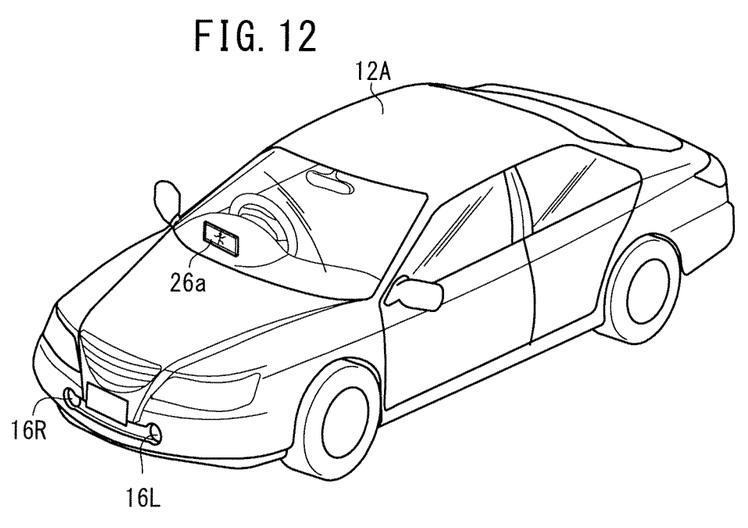
FIG. 12 is a perspective view of a vehicle that incorporates therein a vehicle periphery monitoring apparatus according to a modification of the present invention.

For example, as shown in FIG. 12, a vehicle periphery monitoring apparatus may have a set of left and right infrared cameras 16R, 16L, which are mounted on a vehicle 12A. The infrared cameras 16R, 16L, which are used as stereo cameras, are mounted on a front bumper of the vehicle 12A in respective positions substantially symmetrical with respect to the center of the vehicle 12A along the transverse direction thereof. The two infrared cameras 16R, 16L have parallel optical axes, respectively, which are fixed in position at the same height from the road surface. As is well known in the art, the vehicle periphery monitoring apparatus including the set of left and right infrared cameras 16R, 16L regards as objects high-temperature areas, which are present in an image of the periphery of the vehicle 12A captured by the infrared cameras 16R, 16L. In addition, the vehicle periphery monitoring apparatus calculates distances up to the objects according to triangulation based on the parallax of the objects in the left and right images captured by the infrared cameras 16R, 16L. Further, the vehicle periphery monitoring apparatus detects an object that may affect traveling of the vehicle 12A, i.e., an object having a possibility of collision with the vehicle 12A, based on the directions of travel (motion vectors) and positions of the objects, and generates an attention calling output signal.

Rather than an infrared camera or cameras, in a similar manner as in the present embodiment, the vehicle periphery monitoring apparatus 10 may employ, as a single camera or a stereo camera, a general digital video camera (image capturing device) for capturing an image in an ordinary visible light range.

The invention claimed is:

1. A vehicle periphery monitoring apparatus for monitoring the periphery of a vehicle using an image captured by an image capturing device mounted on the vehicle, comprising:
   a pedestrian detection processor for detecting a pedestrian as an object to be monitored from the image;
   an animal detection processor for detecting an animal as an object to be monitored from the image;
   a pair object judgment processor for judging that the pedestrian and the animal, which are detected from the image, are a pair object, if the pedestrian and the animal are in a predetermined relationship to each other; and an attention calling output generation judgment section for judging whether or not an attention calling output signal for calling attention of the driver of the vehicle should be generated, wherein, if the pair object judgment processor judges that the pedestrian and the animal are the pair object, the attention calling output generation judgment section does not generate the attention calling output signal for the animal of the pair object.

2. The vehicle periphery monitoring apparatus according to claim 1, wherein the pair object judgment processor judges that the pedestrian and the animal are the pair object if the pedestrian and the animal are present within a predetermined range.

3. The vehicle periphery monitoring apparatus according to claim 1, wherein the pair object judgment processor judges that the pedestrian and the animal are the pair object if a height of the animal is smaller than a height of the pedestrian.

4. The vehicle periphery monitoring apparatus according to claim 1, wherein the pair object judgment processor judges that the pedestrian and the animal are the pair object if a string is detected between the pedestrian and the animal.

5. The vehicle periphery monitoring apparatus according to claim 1, further comprising:
a display for displaying an image based on the attention calling output signal,
wherein the attention calling output signal represents a single frame surrounding the pair object on the display for thereby calling the attention of the driver.

* * * * *